June 24, 1941.    L. A. PRESTON    2,246,813
VEHICLE BED CONSTRUCTION
Filed April 3, 1939    2 Sheets-Sheet 1

INVENTOR
LAURENCE A. PRESTON
Jesse R. Stone
Lester D. Clark
ATTORNEYS

June 24, 1941.  L. A. PRESTON  2,246,813
VEHICLE BED CONSTRUCTION
Filed April 3, 1939   2 Sheets-Sheet 2

INVENTOR
LAURENCE A. PRESTON

Jesse R. Stone
Lester B. Clark
ATTORNEYS

Patented June 24, 1941

2,246,813

UNITED STATES PATENT OFFICE 2,246,813

VEHICLE BED CONSTRUCTION

Laurence A. Preston, Houston, Tex.

Application April 3, 1939, Serial No. 265,672

1 Claim. (Cl. 296—26)

This invention relates to a vehicle bed construction and particularly a construction utilized in combination with the turtle deck of an automotive vehicle body whereby a temporary bed may be readily provided.

The invention contemplates the provision of an extension to the turtle deck or luggage compartment of an automobile body, support means therefor, and a canopy adapted to be secured about the periphery of the extension and extend upwardly over the compartment cover or door, which serves to support the canopy.

It is the general object of the invention to provide a vehicle bed which may be readily assembled and disassembled and which will occupy a minimum of space when stored for travel.

Another object is to provide a vehicle bed construction which utilizes a turtle deck extension to which is attached a canopy supported by the door or cover for the turtle deck compartment.

Another object is to provide a novel construction for supporting the turtle deck extension during assembly with the fixed deck and also when using the construction as a bed.

Still another object is to provide a vehicle bed including a canopy passing over and supported by the open door or cover of the turtle deck or luggage compartment.

These and other objects will be apparent from the following description taken in connection with the drawings in which.

Figure 1:
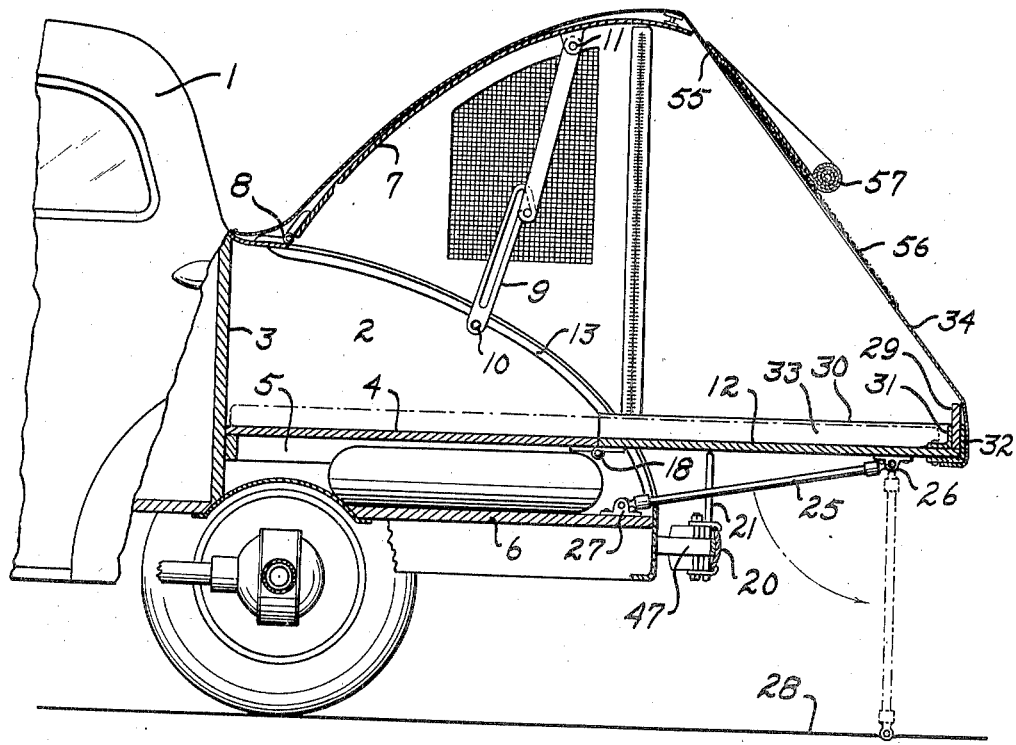
Fig. 1 is a sectional view through the rear end of a coupe body illustrating an embodiment of the invention.
Figure 2:
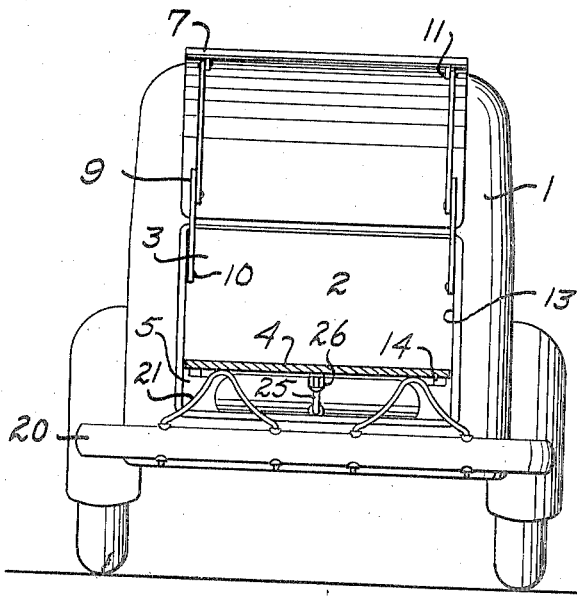
Fig. 2 is a rear view of a vehicle with canopy removed to show the support construction.
Figure 3:
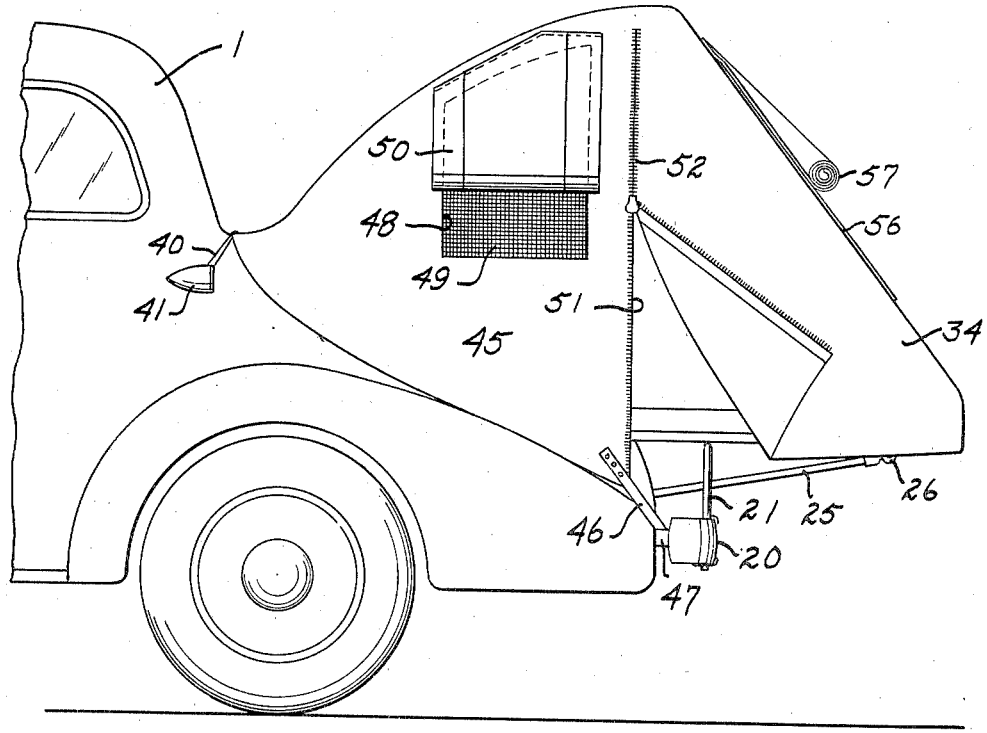
Fig. 3 is a side assembly view of the device of the invention.

In Fig. 1 the invention is illustrated in combination with a vehicle body 1 having a luggage compartment 2 rearwardly of the verticle wall 3. The compartment 2 is provided with a floor or deck 4 above the spare tire compartment 5 having a nether floor 6. The door or cover 7 is hinged to the body at 8 and lifts upwardly to open the compartment 2. This cover is held uppermost or in open position by means of a latching mechanism 9 which is pivotally connected to the body and cover at 10 and 11, respectively.

Figure 4:
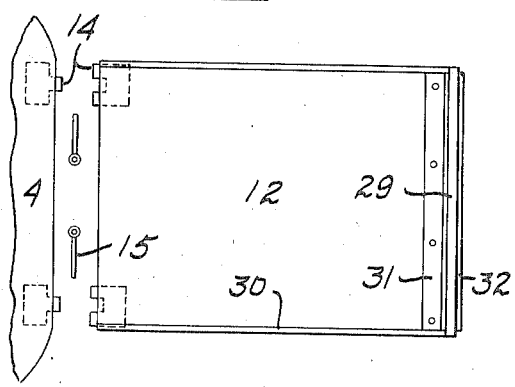
Fig. 4 is a plan view of the extension deck illustrating the manner of attachment of the extension to the turtle deck of the vehicle.

In order to provide a bedding surface of sufficient length to accommodate a person, a deck extension 12, of a width to enter the opening 13 in the vehicle body is provided. This extension and the deck 4 are provided with complementary connector members 14, best shown in Fig. 4 as hinge members having removable pintles 15.

The rear bumper 20 has inverted V-shaped support and guard members 21, upon which the extension 12 may be substantially balanced while the complementary elements of the connectors 14 are brought into mating relation for insertion of the pintles 15. Thereafter the members 21 continue to serve as support for the extension 12. Additional support for extension 12 is provided in an arm 25 which is pivotally attached to the nether surface of the extension at 26. The opposite end of this arm is releasably attached to a support 27 on the floor of the spare tire compartment 5. If desired this arm may be swung downwardly to the position shown in dotted outline in Fig. 1 so that the outer end of the deck extension will be supported directly from the roadway 28 upon which the vehicle stands.

The deck extension 12 is provided with an upwardly extending end rail 29 and side rails 30, the former of these rails being securely held in place by means of angles 31 and 32.

An enclosure for the bed 33 is provided by canopy 34 which is supported upon the cover 7. The forward end of this canopy has fasteners 40 which may be secured to the vehicle body as by the bracket of lamp 41. The side wall 45 fits closely adjacent the sides of the compartment 2 and are tightly held in place by straps 46 attached to the bumper support 47. The side walls also have an opening 48 in which a suitable netting 49 is fixed, a rolled flap 50 being provided so that the side wall may be completely closed. Rearwardly of the opening or window 48 is a vertical slit 51 which may be closed by means of hookless fastener 52 or other suitable closure means.

The rearward wall 55 of the canopy 34 is also provided with an opening covered with a netting 56 and a roll flap 57 so that such opening may be kept open or closed as desired. The sidewalls surrounding the deck extension 12 are provided with snaps, buttons, or the like, so that these walls may be attached to the deck extension.

In assembling and using the described construction, the cover 7 is lifted to open position and extension 12 is fixed in place. The cover 7 is then lowered and a canopy is placed thereover and secured to the vehicle body and the extension 12 as indicated. With fastener 52 open, access is had to the cover 7 which is lifted to its uppermost position to stretch the canopy into position for use. It is to be understood that the bed 33 upon the deck 4 and the extension 12 may be made up either before or after the canopy 34 is in position.

While specific details of the construction have been described, it is understood that the invention is not confined thereto, but broadly comprehends a vehicle bed construction which is readily assembled and disassembled and which will occupy a minimum amount of space when stored for travel.

The invention claimed is:

A vehicle body including upper and lower spaced decks thereon, a deck extension detachably connected to said upper deck at its rear edge and normally detached from the upper deck and resting thereon, support means on the vehicle rearwardly of the upper deck adapted to support the extension while such extension is being connected to and disconnected from the upper deck, a cover hinged to said body and normally enclosing said decks, said upper deck and extension, when opened, extending in a common plane, means on said lower deck to support the outer end of said extension, a canopy enclosure secured at one end to said body, enclosing said cover and secured at the other end to said extension, means to support said cover in open position, and a hookless fastener in the side wall to permit ingress and egress to and from said enclosure, said upper deck and extension forming a self-contained unit enclosed by said canopy.

LAURENCE A. PRESTON.